(12) United States Patent
Petersen

(10) Patent No.: US 8,284,776 B2
(45) Date of Patent: Oct. 9, 2012

(54) RECURSIVE PACKET HEADER PROCESSING

(75) Inventor: Brian Petersen, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 288 days.

(21) Appl. No.: 12/609,769

(22) Filed: Oct. 30, 2009

(65) Prior Publication Data

US 2010/0316052 A1    Dec. 16, 2010

Related U.S. Application Data

(60) Provisional application No. 61/185,898, filed on Jun. 10, 2009.

(51) Int. Cl.
*H04L 12/28* (2006.01)
*H04L 12/56* (2006.01)
*H04J 3/16* (2006.01)
*H04J 3/24* (2006.01)

(52) U.S. Cl. ......... 370/392; 370/401; 370/469; 370/474

(58) Field of Classification Search ......................... None
See application file for complete search history.

(56) References Cited

U.S. PATENT DOCUMENTS

| | | | | |
|---|---|---|---|---|
| 6,947,971 B1 * | 9/2005 | Amos | ........................ | 709/213 |
| 6,990,121 B1 * | 1/2006 | Stiles et al. | .................... | 370/498 |
| 7,075,926 B2 * | 7/2006 | Cathey et al. | ................. | 370/389 |
| 7,221,675 B2 * | 5/2007 | Bryden et al. | ................. | 370/392 |
| 2003/0231625 A1 * | 12/2003 | Calvignac et al. | ............ | 370/389 |
| 2009/0207857 A1 * | 8/2009 | Alexander, Jr. | ............... | 370/474 |

OTHER PUBLICATIONS

Pelletier, G., et al., RFC 5225: RObust Header Compression Version 2 (ROHCv2), Network Working Group, Apr. 2008, pp. 1-25.*
Information Sciences Institute, RFC 791: Internet Protocol, Defense Advanced Research Projects Agency, Sep. 1981.*

* cited by examiner

*Primary Examiner* — Faruk Hamza
*Assistant Examiner* — Cassandra Decker
(74) *Attorney, Agent, or Firm* — Brake Hughes Bellermann LLP

(57) ABSTRACT

According to one general aspect, an apparatus may include an ingress port, a header cache, and a plurality of ingress recursion engines. In some embodiments, the ingress port may be configured to receive a packet that comprises a data portion and a header portion, wherein the header portion comprises at least one header. In various embodiments, the header cache may be configured to store at least a part of the header portion of the packet. In one embodiment, the plurality of ingress recursion engines may be configured to recursively process the header portion, from outer-most header to inner-most header, until an adjacency value for the packet is determined. In some embodiments, each ingress recursion engine may be configured to process a header from the header portion.

20 Claims, 5 Drawing Sheets

RECURSIVE PACKET HEADER PROCESSING

CROSS-REFERENCE TO RELATED APPLICATION

This application claims priority under 35 U.S.C. §119 to U.S. Provisional Patent Application 61/185,898, filed Jun. 10, 2009, titled "RECURSIVE PACKET HEADER PROCESSING," which is incorporated herein by reference in its entirety.

TECHNICAL FIELD

This description relates to communicating information, and more specifically to processing header information recursively.

BACKGROUND

Typically, architectures for packet routing devices include pipelined modules or functional unit blocks that each perform operations on the received packets of data. However, such a hardware model is at odds with a processing architecture that is more closely aligned with idealized conceptual models of packet header structures and network operations.

One clear example of such a hardware-centric emphasis on processing architectures is the linear processing pipeline. Often the motivation to adopt a pipeline-like structure is clear. Generally a pipeline, like a factory's assembly line, has multiple packets in process simultaneously; with the packets moving from one specialized processing stage to the next in a rigidly timed lock-step fashion. Unfortunately, the desired packet processing behavior doesn't map neatly to a pipeline owing to the wide variety of possible header configurations.

Pipelines are also typically unable to vary their per-packet processing time. While this usually affords the benefit of easily guaranteeing line-rate performance under all circumstances, this is not necessarily ideal.

SUMMARY

A system and/or method for communicating information, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 2:
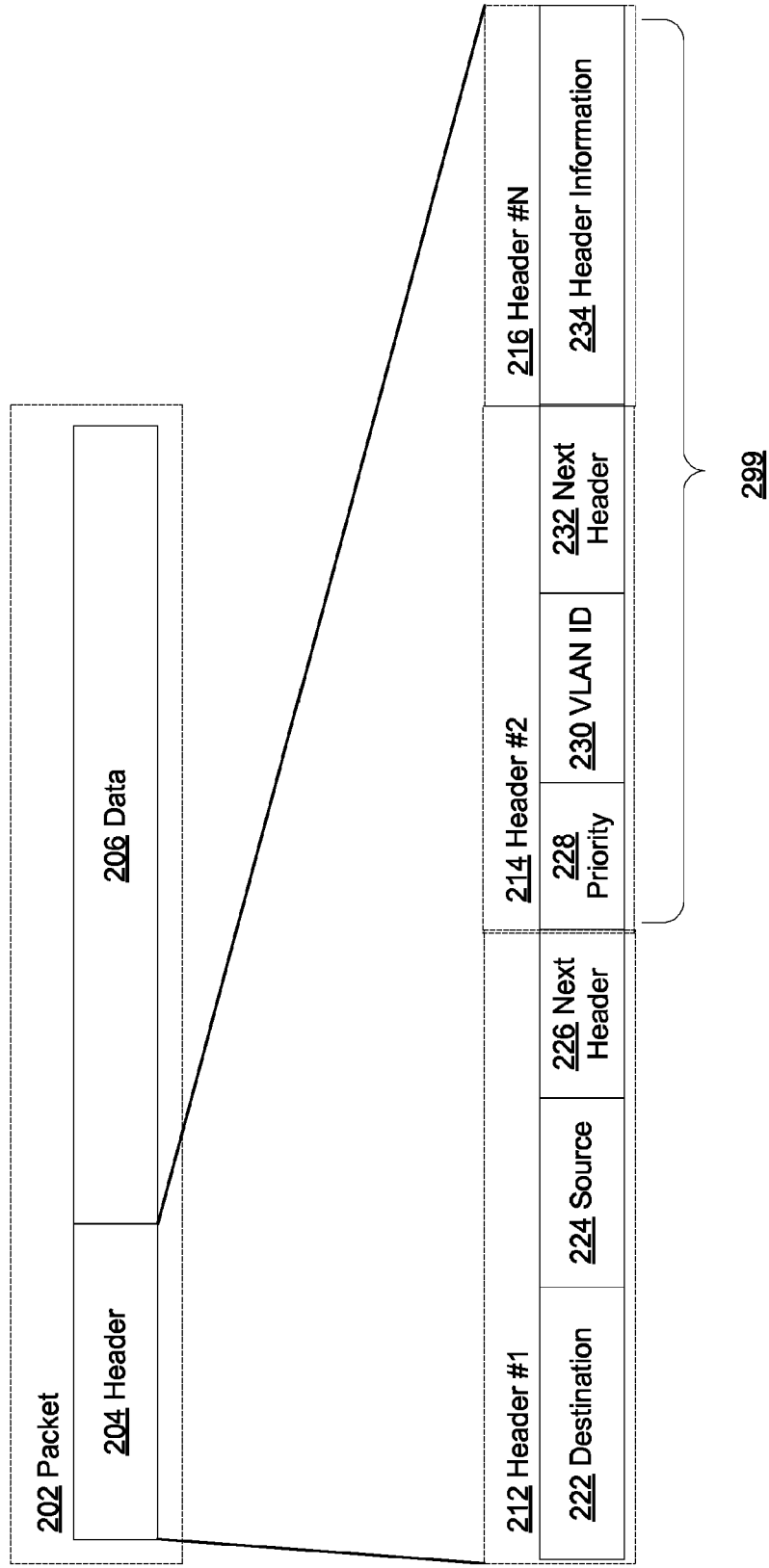
FIG. 2 is a block diagram of an example embodiment of a data packet in accordance with the disclosed subject matter.

FIG. 2 is a block diagram of an example embodiment of a data packet 202 in accordance with the disclosed subject matter. In various embodiments, data packets or frames, etc. (herein, simply "packets") may be used within a communication network to transfer or transmit information from a source network device to a destination network device. In various embodiments, these packets 202 may generally include a header portion 204 and a data portion 206. In various embodiments, the header portion 204 may include various information regarding how the packet 202 is to be handled by various networking devices it encounters along the way from the source networking device to the destination network device. In some embodiments, the data portion 206 is merely the data or information being communicated; although, in various embodiments, the data portion 206 may include encapsulated headers and the data being communicated (e.g., via an encryption protocol, etc.).

In many embodiments, the header portion 204 may include a plurality of headers (e.g., headers 212, 214, and 216, etc.). These headers generally include various types, wherein each type includes a different piece or pieces of information detailing how the packet is to be handled or processed. In various embodiments, different networking devices may or may not care about the information contained within a given header (e.g., header 214), but nonetheless are expected to forward that information along with the packet so that another network device, which may care about the header, will have the information available.

Headers (e.g., headers 212, 214, etc.) are generally prepended in front of the data portion 206 and may be thought of as wrapped around the data portion 206. An analogy is often drawn between the layered nature of headers and the layered nature of an onion. In this context, the first header (e.g., header 212) farthest from the data portion 206 may be considered the "outer-most" header, and the last header (e.g., header 216) closest to the data portion 206 may be considered the "inner-most" header.

As described above, various types of headers may include various and standardized pieces of information. For example, in one embodiment, examples of headers may include MAC based headers, VLAN based headers, TCP headers, ICMP headers, MACsec headers, NAT headers, LLC headers, etc.; although, it is understood that the above are merely a few illustrative examples to which the disclosed subject matter is not limited.

As an example, header 212 may include a MAC header. In such an embodiment, the MAC header 212 may include a destination network address field or portion 222 which indicates the network address of the destination network device that will finally receive the packet 202. In one embodiment, the MAC header 212 may include a source network address field or portion 224 which indicates the network address of the source network device that originally transmitted the packet 202. In some embodiments, the MAC header 212 may include a next header field or portion 226 that indicates what type of header the next header is (e.g., a VLAN header), or if the current header is the last or inner-most header.

Continuing the example, header 214 may include a VLAN header. In such an embodiment, the VLAN header 214 may include a priority field or portion 228 configured to indicate the priority level of the packet 202. In one embodiment, the VLAN header 214 may include a VLAN identifier (ID) field or portion 230 configured to indicate which VLAN the packet 202 is associated with. In some embodiments, the VLAN header 214 may include a next header field or portion 232 that indicates what type of header the next header is, or if the current header is the last or inner-most header.

Finally for the example, further headers (e.g., header 216) may include their own header information 234 based upon their respective header types. It is understood that the above are merely a few illustrative examples to which the disclosed subject matter is not limited.

In various embodiments, one or more of the headers (e.g., header 212 and 214, etc.) may be processed by a network device (e.g., a network router, network switch, etc.) in order to determine how a packet 202 is to be handled and to which network device the packet 202 is to be transmitted to. In some embodiments, once the destination or next hop networking device has determined, the packet 202 may be forwarded to the said destination or next hop network device.

Figure 1:
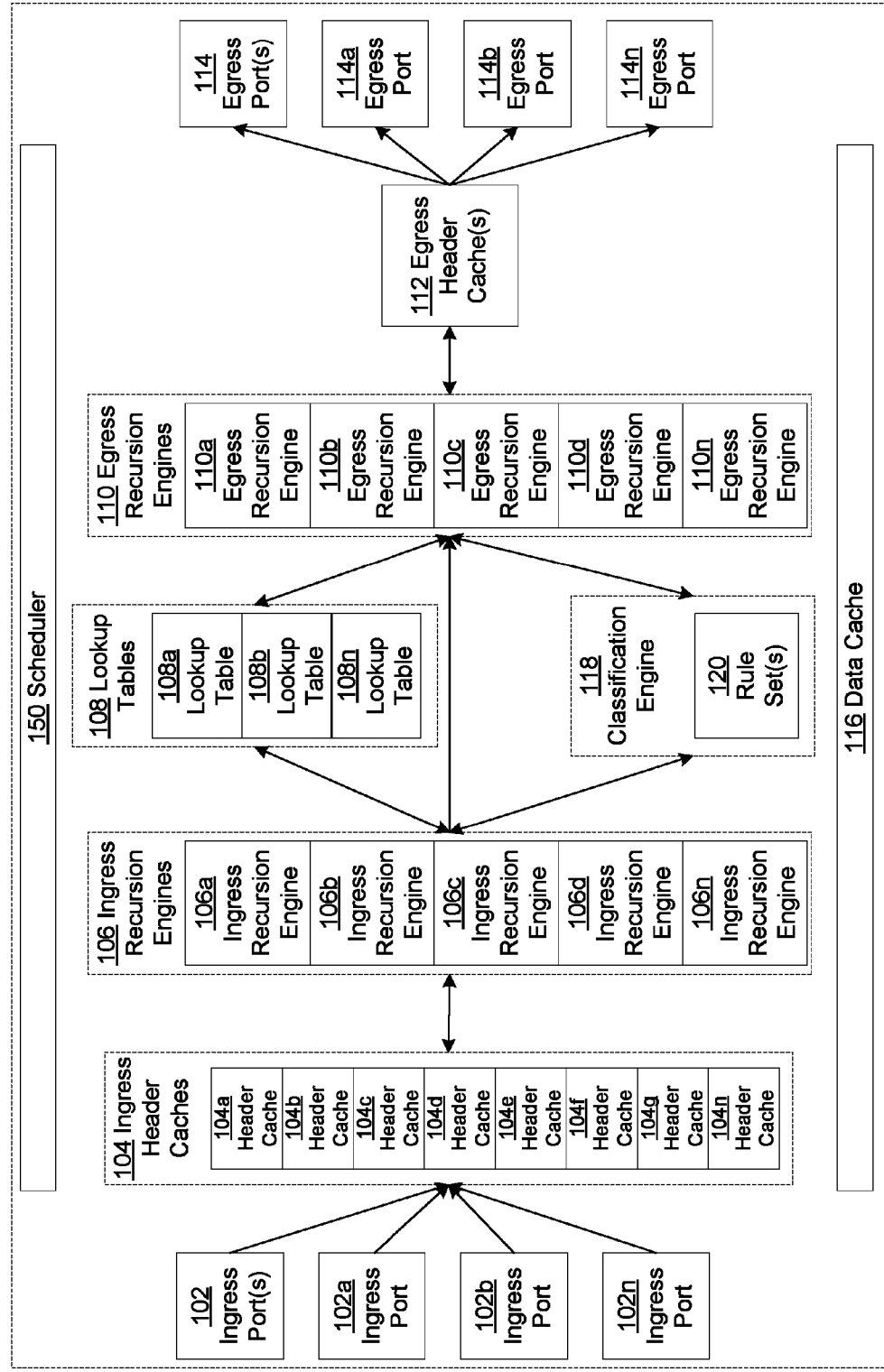
FIG. 1 is a block diagram of an example embodiment of a system in accordance with the disclosed subject matter.

FIG. 1 is a block diagram of an example embodiment of a system or apparatus 100 in accordance with the disclosed subject matter. In various embodiments, the system 100 may include an architecture for packet routing devices (e.g., a network switch, a network router, etc.) that employs, at least in part, recursive processing, as compared to pipelined processing, of data packets. In one embodiment, the system 100 may include a number of ingress ports 102 (e.g., ingress ports 102a, 102b, and 102n, etc.), a header cache or ingress header cache 104, and a plurality of ingress recursion engines 106. In some embodiments, the system 100 may also include one or more of a number of lookup tables 108 (e.g., lookup tables 108a, 108b, and 108n, etc.), a data cache 116, a classification engine 118, a scheduler 150, a plurality of egress recursion engines 110, an egress header cache or caches 112, and a number of egress ports 114 (e.g., egress ports 114a, 114b, and 114n, etc.).

In various embodiments, the ingress ports 102 may be configured to receive a packet (or frame, etc.) that comprises a data portion and a header portion. In some embodiments, the header portion may include at least one header. In various embodiments, a wide variety of headers may be used or may exist. For example, in one embodiment, examples of headers may include MAC based headers, VLAN based headers, TCP headers, ICMP headers, MACsec headers, NAT headers, LLC headers, etc.; although, it is understood that the above are merely a few illustrative examples to which the disclosed subject matter is not limited.

In various embodiments, these multiple headers may be concatenated or appended to each other. Generally, although not necessarily, the user data portion may be appended to at or towards the end of the packet, after the headers. In various embodiments, some headers may be included as part of the user data portion (e.g., via an encryption protocol, etc.). Header arrangement is discussed further in regards to FIG. 2.

In some embodiments, the system 100 may include at least one header cache or ingress header cache 104 (e.g., ingress header caches 104a, 104b, 104c, 104d, 104e, 104f, 104g, and 104n, etc.). In various embodiments, this ingress header cache 104 may be configured to store at least a part of the header portion of the packet. In such an embodiment, once a packet has been received the header portion may be stored within or by the ingress header cache 104 and the data portion or what is then understood as the data portion may be stored within a data cache 116. In one embodiment, if the system 100 incorrectly determined the header/data portion boundary, as the boundary is better understood, the mis-diagnosed portion of the header may be moved from the data cache 116 to the ingress header cache 104.

In one embodiment, the system 100 may include at least one ingress recursion engine 106 (e.g., ingress recursion engines 106a, 106b, 106c, 106d, and 106n, etc.). In various embodiments, this ingress recursion engine 106 may be configured to process a header from the header portion. In various embodiments, the plurality of ingress recursion engines 104 may be configured to recursively process the header portion, from outer-most header to inner-most header, until an adjacency value for the packet is determined.

In this context an adjacency value is defined as a value that indicates a network device topologically adjacent or connected with the current system or apparatus 100 and within the route to be traveled by the packet from its ultimate source to its ultimate destination.

It is understood that packets generally include a source network device (or source network address) from which the packet was originally transmitted, and a destination network device (or destination network address) to which the packet is being transmitted. (Multicast packets may address multiple destination devices.) The path or route traveled by the packet from the source device to the destination device often includes a number of intermediate network devices (e.g., the system or apparatus 100). These intermediate network devices may receive the packet and then forward the packet (or at least the data portion of the packet) to the next intermediate network device along the route or to the destination device itself. The device the apparatus 100 forwards the packet to is considered an adjacent network device.

In various embodiments, once this adjacent network device is determined from or based upon the header information, the plurality of ingress recursion engines 104 may be configured to stop or halt header processing. In such an embodiment, the packet or at least the data portion thereof, may be transmitted to the egress portion of the apparatus 100 (e.g., egress recursion engines 110 and egress ports 114, etc.) for transmittal to the adjacent network device.

In various embodiments, a header portion may be assigned to a specific ingress recursion engine (e.g., ingress recursion engine 106b). In such an embodiment, the ingress recursion engine 106b may retrieve the header portion from the appropriate header cache (e.g., ingress header cache 104c) and perform any needed processing upon the outer-most header. In various embodiments, processing may vary depending upon the type of header encountered. Therefore, in one embodiment, each ingress recursion engine 106 may be configured to process a plurality of header types.

In various embodiments, each ingress recursion engine 106 may be configured to determine what type of header is included in the outer-most header, and then based upon header type vary the type of processing performed. In various embodiments, general processing may include retrieving any stored values included in the header (e.g., VLAN identifier, private Ethernet type values, source/destination network addresses, priority values, etc.), storing the retrieved values or at least a portion thereof, and determining if any of the retrieved values results in the determination of an adjacency value, or, if not, if another header exists within the header portion.

In various embodiments, the ingress recursion engines 106 may be configured to process different header types. For example, in one embodiment, the more header types an ingress recursion engine (e.g., ingress recursion engine 106d) is configured to process, the more complicated and design and/or manufacturing resources the ingress recursion engine 106d may consume. Therefore, in various embodiments, the apparatus 100 may include a number of ingress recursion engines 106 configured to process different groups of header types. For example, a portion of the ingress recursion engines 106 may be configured to process the more common header types, a second portion may be configured to process any security related header types, and a third portion may be configured to process the more common header types and lesser used header types. In such an embodiment, the assignment of a header to a particular ingress recursion engine 106 may be based at least in part upon the type of header to be processed and the utilization of resources within the apparatus 100. However, in another embodiment, all ingress recursion engines 106 may be configured to process the same header types, such that any ingress recursion engine 106 may or be expected to process any header.

In one embodiment, a particular ingress recursion engine (e.g., ingress recursion engine 106c) may be assigned to process all of the headers of a particular packet until an adjacency value is determined. In another embodiment, a particular ingress recursion engine (e.g., ingress recursion engine 106c) may be assigned or configured to process a single header of the header portion and return the remaining headers to the ingress header cache 104 (assuming an adjacency value is not determined). In such an embodiment, another ingress recursion engine (e.g., ingress recursion engine 106a) may subsequently be assigned to process the next inner-most header and so on, until an adjacency value is determined. In one embodiment, once a header has been processed by the ingress recursion engine 106, the header may be removed or deleted, and any information retrieved from that header may be stored, for example in the ingress header cache 104 or another memory (not explicitly illustrated).

In various embodiments, processing a header may include the use of a lookup table 108 (e.g., lookup tables 108a, 108b, and 108n, etc.) or other reference or shared resource. In some embodiments, these lookup tables 108 may be configured to return stored values in response to receiving a combination of header fields, interface identifiers, and adjacency values, etc. In such an embodiment, the lookup tables may be configured to take as input various information retrieved by the ingress recursion engine 106 from the header or fields of the header and return various stored values. In some embodiments, what are illustrated as lookup tables 108 may include combinational logic or FUBs that convert header field information into a more usable form via a means other than a lookup table.

In some embodiments, the number of lookup tables 108 may be less than the number of ingress recursion engines 106. In such an embodiment, the scheduler 150 may be configured to attempt to maximize the use of the lookup tables 108. In one embodiment, the number of ingress header caches 104 may be a first relatively large number. The number of ingress regression engines 106 may be a second relatively medium number, and the number of lookup tables 108 may be a third relatively small number. It is understood that the terms "large", "medium" and "small" are relative to each other and show a decreasing number of elements. In such an embodiment, the number of relatively resource high (e.g., die area, etc.) elements (e.g., lookup tables 108, regression engines 106, etc.) may be reduced and may simultaneously be highly used, such that no "expensive" elements are lying idle during operation.

In one embodiment, the apparatus or system 100 may include a classification engine 118 configured to determine how a packet is to be processed and/or forwarded based upon information stored within the packet's header portion. In various embodiments, the classification engine 118 may base such a determination upon a set or sets of rules 120.

In various embodiments, the one header at a time processing paradigm employed by the recursive method may not lend itself to the multi-tuple classification that is often employed for access control, flow-based processing and policy-based forwarding, etc. Multi-tuple classification may, in one embodiment, include being presented with a very wide search argument that includes all or a large amount of the relevant information retrieved or culled from the processing of multiple headers.

In various embodiments, the serial nature of the recursive process and because it is desirable to leverage the lookups performed for forwarding purposes, the classification engine 118 may be configured to accumulate the header information or equivalency values and other header data as it is presented or retrieved by the various ingress recursive engines 106. In such an embodiment, this piecemeal information may then be concatenated into a wide parallel word for a somewhat conventional rule match operation. Alternatively, in another embodiment, an incremental rule matching process may be employed where the classification engine 118 is configured to use each received batch of information to narrow down the search for the first matching rule.

In various embodiments, the classification engine 118 may be configured to operate in parallel with the ingress and egress recursive engines 106 and 112. In various embodiments, the results of the classification, which may, in one embodiment, include a forwarding or routing override, may be combined with the recursive forwarding results in a reconciliation stage that follows the classification and forwarding functions; although, it is understood that the above is merely one illustrative example to which the disclosed subject matter is not limited.

In one embodiment, the classification engine 118 may be configured to effectively ignore irrelevant header information. For example, in one embodiment, if a packet is exiting a tunnel and being forwarded based on the headers associated with the encapsulated packet, then the outer headers that are associated with identifying the current tunnel termination point may not be relevant and may be simply be ignored. Similarly, in another embodiment, Access Control Lists (ACLs) for routed packets may need not include the MAC header fields. In such an embodiment, by ignoring irrelevant data table entries that define these values and associate them with rules, the irrelevant data may no longer necessary and may be removed.

In one embodiment, the system or apparatus 100 may include a plurality of egress recursion engines 110 (e.g., egress recursion engines 110a, 110b, 110c, 110d, and 110n, etc.). In various embodiments, each egress recursion engine 110 may be configured to recursively build a new header portion, from the inner-most header to the outer-most header, until a header is associated with an interface identifier. In this context, an "interface identifier" includes an identifier that indicates which egress port or other network interface from which to transmit the packet. In various embodiments, each egress recursion engine 110 may be configured to add one or more headers to the new header portion of the packet.

In various embodiments, the performance or operation of the egress recursion engine 110 may mirror that of the ingress recursion engine 106. In such an embodiment, instead of removing and processing headers from outer-most to inner-most, the egress recursion engine 110 may create and add headers from inner-most to outer-most. In various embodiments, the egress recursion engine 110 may build or construct the headers using or employing the information obtained via the ingress recursion engines 106.

In some embodiments, the apparatus 100 may include a plurality of egress header caches 112. In various embodiments, these egress header caches 112 may be configured to store the header portion of a packet during the egress stage of packet processing. In various embodiments, similar to the way a header is stored within the ingress header caches 104, a particular egress header cache 112 may store a single header portion. This header portion may be accessed by a given egress recursion engine 110 for processing. Upon completion of the creation and addition of a header, the updated header portion (including the new header) may be returned to the egress header cache 112 or another cache within the plurality of egress header caches 112.

In various embodiments, once the header portion of the packet has been fully rebuilt or at least when an interface identifier for the packet has been determined, the packet may be transmitted to the next network device via one of the plurality of egress ports 114.

In the illustrated embodiment and elsewhere in the document, references are made to processing just a single header at once. While, in a preferred embodiment, this may be the idealized form of processing, it is understood that this is merely one illustrative example to which the disclosed subject matter is not limited. In various embodiments, more than one header may be combined into a single meta-header and processed as the single meta-header (illustrated by grouping 299 in FIG. 2). For example, in various embodiments, a MAC header and one or more Virtual Local Area Network (VLAN) headers may be reasonably combined to form a single header or meta-header that may be processed as a single unit; although, it is understood that the above are merely another illustrative example to which the disclosed subject matter is not limited.

In various embodiments, the fate of certain packets may not be fully determined during ingress processing and their exact handling and processing requirements become apparent during egress processing. For these packets, in one embodiment, it may be desirable to re-circulate them and forward them a second time within the apparatus 100 as if they were newly received. In the case of an incorrect transmit interface as determined by a packet's newly-added outermost header, the outermost header may serve as a reliable means for redirecting the packet to its appropriate transmit port through normal forwarding means and without extensive header examinations or manipulations.

In various embodiments, the outermost headers may generally be a MAC address header and a VLAN header. These headers can be used to simply bridge the packet to the correct transmit port. In various embodiments, other techniques for recirculation are egress mirroring and copying and/or redirecting packets to a supervisor processor, component or apparatus due to an egress ACL action. Although, it is understood that the above are merely a few illustrative examples to which the disclosed subject matter is not limited.

In such an embodiment, the packet may have been fully formatted for transmission and recirculated into ingress processing as may be normal for redirected or recirculated packets. In such an embodiment, however, normal forwarding based on the address headers of the packet may not desired. In one embodiment, a cross-connect directly to the appropriate destination may be employed. This may be, in one embodiment, accomplished by assigning an interface value to the packet that is interpreted by the ingress processing function as a receive interface whose only possible destination is one or more egress ports, the mirroring port or the supervisor component or apparatus, as is appropriate. Although, it is understood that the above is merely one illustrative example to which the disclosed subject matter is not limited.

In a preferred embodiment, the recursive packet header break down and packet build up operations may be co-located such that the results of the ingress recursive packet header break down may simply feed directly into the egress recursive packet header creation or build-up. In such an embodiment, the ingress recursion engines 106 and egress recursion engines 110 may be integrated.

However, in various embodiments, the addition or encountering of multicast packets may complicate things. In this context, multicast packets include packets with multiple destination addresses such that a packet may be copied and sent to a plurality of network devices via a plurality of egress ports 114.

In such an embodiment, the ingress recursion engines 106 and egress recursion engines 110 may be separated (as illustrated). In various embodiments, various reasons may make such a scheme desirable. In one embodiment, it may be desirable to take advantage of fabric-based multicast replication (not illustrated); allowing the fabric- or stack-facing interfaces to operate at approximately the same rate as the aggregate of the apparatus or device's network-facing ports (e.g., portions of ingress ports 102 or egress ports 114, etc.) while delivering many times that bandwidth to the destination egress devices through the effects of packet replication.

In another embodiment, it may be required for each egress port of a multicast set to transmit unique versions of the packet. In such an embodiment, if all of the new headers are added in one place on the ingress side of the fabric or apparatus, then this may result in a performance bottleneck as the single ingress-based packet build up function must supply updated packets to numerous egress devices.

For these reasons and possibly others, the header break down and build up functions may be separated, in various embodiments, and may reasonably be referred to as ingress and egress processing operations, respectively. Although, it is understood that the above are merely a few illustrative examples to which the disclosed subject matter is not limited.

In various embodiments, there may be challenges associated with separating the ingress and egress processing operations to opposite sides of a fabric or stack interface. In one embodiment, the bandwidth between the ingress and egress processing operations may be limited and expensive; increasing the desirability of minimizing of the required amount information to be passed between the two processing operations. In one embodiment, most of the relevant information may be encoded within the header's or packet's adjacency value.

In another embodiment, the identification of the packet's egress ports 114 and eventual network device may be made based upon the ingress recursion engine's 106 adjacency value. In such an embodiment, while the adjacency value may be made to accurately reflect these destinations as well as the next outer header, having it do so may burden the adjacency value and complicate its formulation. In such an embodiment, provisions may be made that allow an adjacency value to be mostly right and not always completely right. If the egress processing operation arrives at a transmit interface identifier that is different than the one that was implied by the ingress adjacency value, in one embodiment, the packet may be re-submitted for ingress processing in the local device or apparatus.

Figure 3:
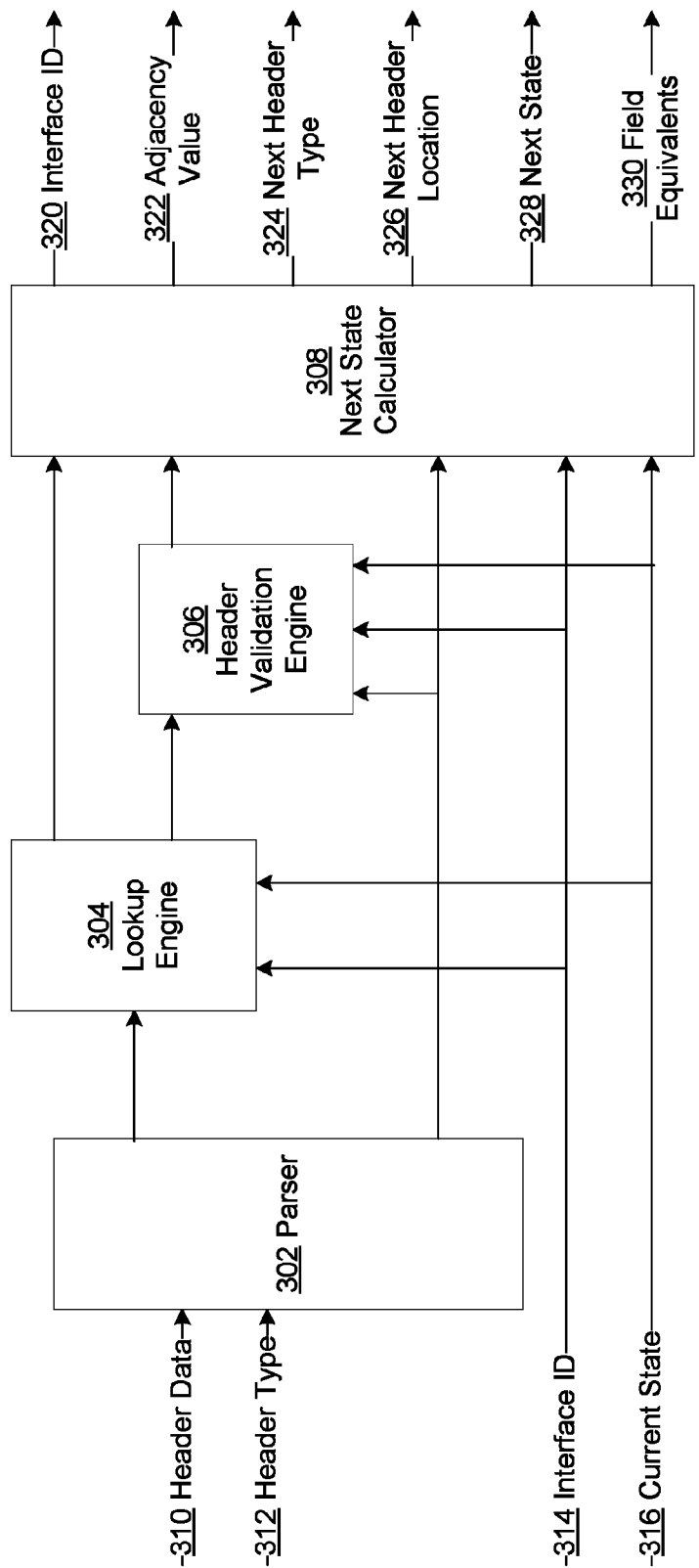
FIG. 3 is a block diagram of an example embodiment of a system in accordance with the disclosed subject matter.

FIG. 3 is a block diagram of an example embodiment of a system or apparatus in accordance with the disclosed subject matter. In one embodiment, the apparatus may include or be an ingress recursion engine 300, as described above. In one embodiment, the ingress recursion engine 300 may include a parser 302, a lookup engine 304, a header validation engine 306 and a next state calculator 308.

In one embodiment, the ingress recursion engine 300 may include a parser 302. In various embodiments, the parser 302 may be configured to accept packet or header data 310 and an indication 312 of the type of header that is being received. In one embodiment, the parser 302 may be configured to receive the header 310 and a header type value 312 and to extract header fields from the header. In such an embodiment, the parser 302 may be configured to isolate the predefined "interesting" fields from the header. In one embodiment, some of these fields may be submitted to a lookup engine 304.

In one embodiment, the ingress recursion engine 300 may include a lookup engine 304. In various embodiments, the lookup engine 304 may be configured to retrieve values from a lookup table using the extracted header fields and, in one embodiment, an interface identifier as search arguments. In various embodiments, the lookup engine 304 may make use of the parsed header fields and the interface identifier 314 as search arguments for lookups into relatively large lookup tables. In such an embodiment, the lookup engine may be configured to turn values such as Internet Protocol version 6 (IPv6) addresses into much smaller values and to return equivalency values or field equivalents 330. In various embodiments, it may be rare for every single address value in a large table to require unique handling. Often, in several embodiments, many unique address values may share the same handling requirements. In such an embodiment, these addresses may be represented by a shared value, for example, the address's equivalency value or address field's equivalent value (e.g., a portion of field equivalents 330). In various embodiments, a series of equivalency values may be desired, for example, one for forwarding, one for access control and one for quality of service; although, it is understood that the above are merely a few illustrative examples to which the disclosed subject matter is not limited. In one embodiment, it may be the forwarding equivalency value that acts as either the interface ID 320 or adjacency value 322 result of the ingress processing.

In one embodiment, the ingress recursion engine 300 may include a header validation engine 306. In one embodiment, the header validation engine 306 may be configured to determine whether or not the header is valid. In various embodiments, the header validation engine 306 may be configured to perform a series of header-type-specific tests in order to ensure that the header being processed is well formed and valid. In various embodiments, defective headers may be cause to discard the associated packet. In some embodiments, the header validation engine 306 may be configured to receive an interface ID 314 and a current state value(s) 316 as input.

In one embodiment, the ingress recursion engine 300 may include a next state calculator 308. In one embodiment, the next state calculator 308 may be configured to, based at least in part upon the outputs of the parser 302, lookup engine 304, header validation engine 306, and the interface identifier 314, generate either a new interface identifier 320 or an adjacency value 322, generate next header type value 324, and generate a next header location value 326. In various embodiments, the next state calculator 308 may be used or configured to pass amounts of information 328 along to the next stage of recursive processing (e.g., as current state values 316); allowing the recursion engines to distinguish between what may otherwise be identical headers. This next recursion state value 328 may be valuable when a single header is submitted for processing more than once as can happen under certain circumstances, as described above.

The following describes the values or meaning of the outputs of the ingress recursion engine 300 in various embodiments. In one embodiment, if the header being processed does not identify the packet's destination (e.g., a layer 2 MAC header for an IP packet), then the Interface ID 320 may be valid and may indicate the virtual interface associated with the next header (e.g., a router or tunnel interface). In some embodiments, the interface ID value 320 may be provided to the ingress recursion engine 300 when the next header is processed.

In one embodiment, if the header being processed does identify the packet's destination, then the adjacency value 322 may be valid and may identify how and to where the packet is to be forwarded. In such an embodiment, the determination of a packet's adjacency value 322 may terminates ingress processing operations for forwarding purposes. However, in some embodiments, header processing may continue for classification or other purposes.

In one embodiment, if further headers are to be processed, the next header type 324 value may provide an encoded indication of what that next header type is. This value may be provided to the ingress recursion engine 300 during the processing of the next header.

In some embodiments, a next header location or offset value 326 may be used to identify the first byte of the next header to be processed. In various embodiments, this value may be equal to the byte count of the current header. However, other values may be used as well. For example, a value that is larger than the current header size may be used to skip over certain headers or extensions. A value of zero may be reserved, in one embodiment, and indicates that the same header is to be submitted again. In various embodiments, a value of −1 may also reserved and indicates that the previous header is to be submitted.

In various embodiments, for looping control and other applications, the next state value or values 328 may become the current state input 316 for the next round of header processing. In some embodiments, the field equivalents or values 330 may be the raw results of the lookup processing or general ingress processing. In various embodiments, field equivalent values 330 may be accumulated as the packet headers are processed and are ultimately used for multituple classification, as described above.

Figure 4:
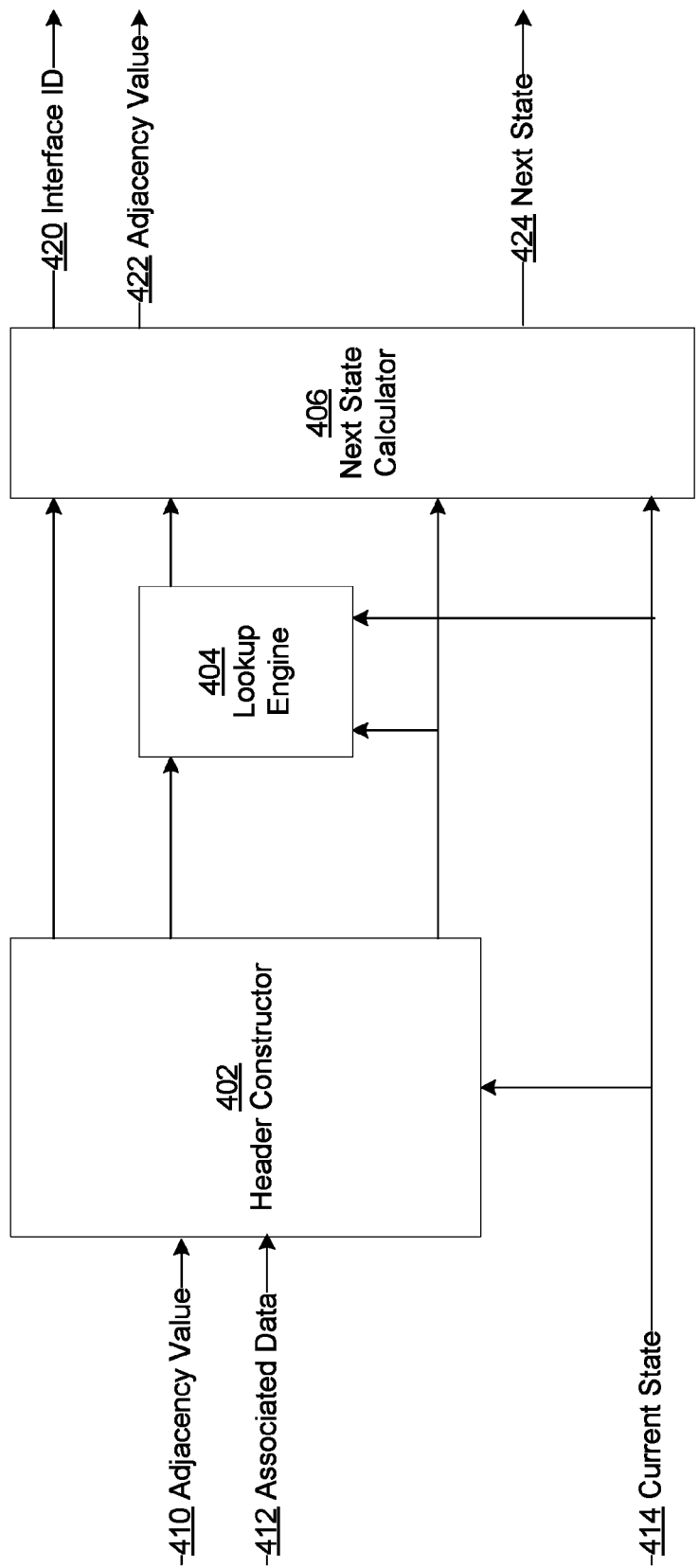
FIG. 4 is a block diagram of an example embodiment of a system in accordance with the disclosed subject matter.

FIG. 4 is a block diagram of an example embodiment of a system or apparatus in accordance with the disclosed subject matter. In various embodiments, the apparatus may include an egress regression engine 400. In some embodiments, the egress regression engine 400 may include a header constructor 402, a lookup engine 404 and a next state calculator 406. In egress processing, in one embodiment, the headers of a packet may be built based at least in part upon adjacency values.

In one embodiment, the header constructor 402 may be configured to accept an adjacency value 410, determine which new header to add, based at least in part upon the adjacency value 410, complete the field values of the new header, and assemble the field values into the new header format. In some embodiments, the adjacency value 410 may be used to fetch or create a new outer header (e.g., associated data 412). For example, the adjacency for a routed packet may be used to fetch or create a new MAC header; although, it is understood that the above is merely one illustrative example to which the disclosed subject matter is not limited. In one embodiment, once the fields for the new header have been retrieved or created, they may be assembled into a properly formed header and prepended to the packet.

In various embodiments, the lookup engine 404 may be configured to provide, based at least in part upon the new header, either a new adjacency value or a new interface identifier. In such an embodiment, the newly added header may be submitted to the lookup engine 404 to determine either a new adjacency value or an interface ID. In one embodiment, if an adjacency value is returned from the lookup, then an additional header may be added to the packet and the packet may be returned for another round of processing. In various embodiments, this recursive process may continue until all of the necessary or desired outer headers have been added to the packet. In various embodiments, the outermost header may be identified by its lookup result being an interface ID rather than an adjacency value. In some embodiments, the interface ID may be validated against the interface associated with the egress processing element that is handling the packet. If there is a mismatch, the packet may be redirected to the local ingress processing element for forwarding to the appropriate transmit interface, as described above.

In some embodiments, the next state calculator 406 may be configured to determine if the header portion of the packet is substantially complete. In various embodiments, if the header portion of the packet is not complete, the next state calculator 406 may be configured to generate information regarding the next header or state 424 of egress recursion processing, which may become the current state values 414 to the next stage of header processing, as described above.

Figure 5:
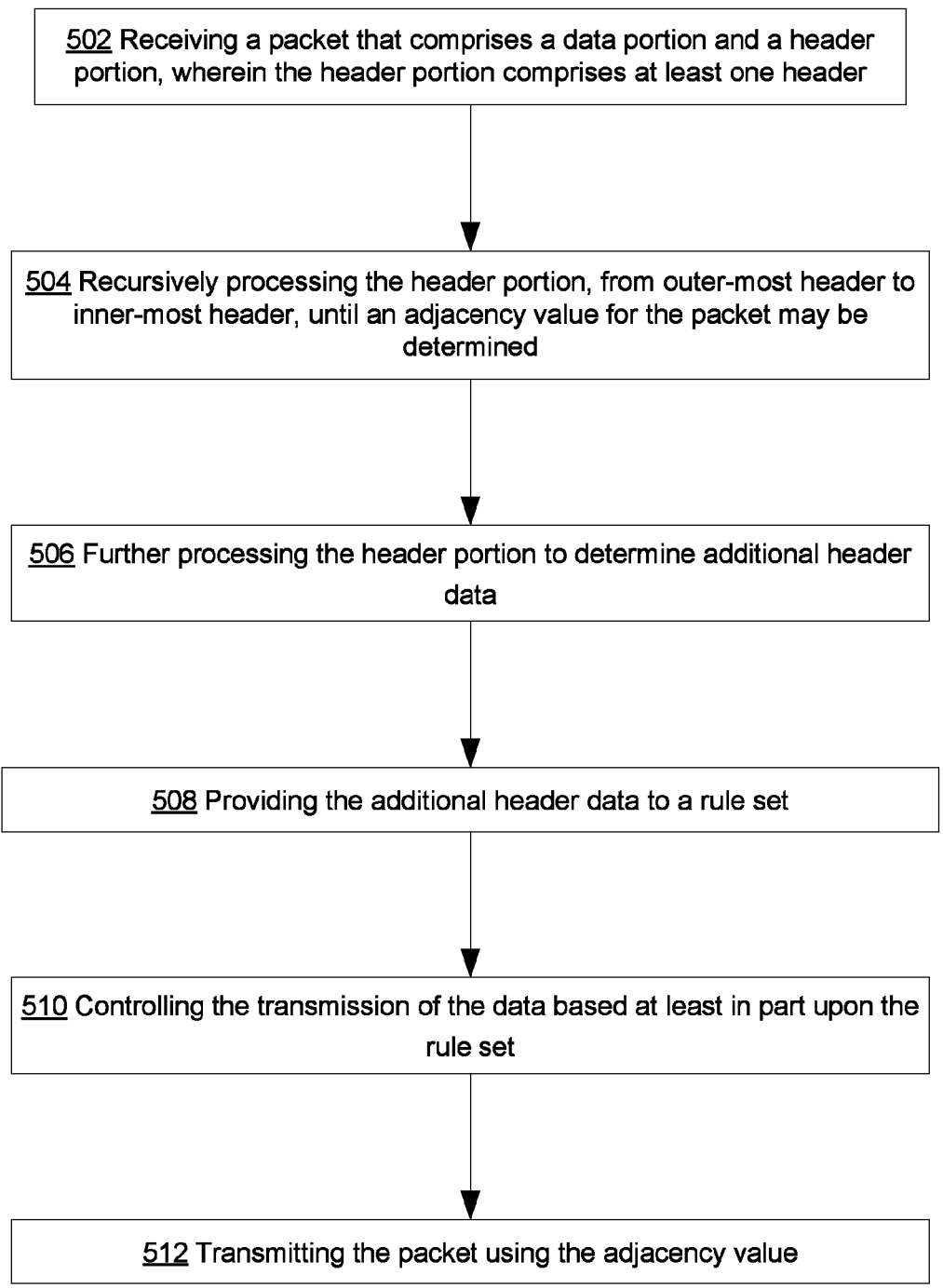
FIG. 5 is a flow chart of an example embodiment of a technique in accordance with the disclosed subject matter.

FIG. 5 is a flow chart of an example embodiment of a technique in accordance with the disclosed subject matter. In various embodiments, the technique 500 may be used or produced by the systems such as those of FIG. 1, 3, or 4. Furthermore, portions of technique 500 may be used or produced by the systems such as that of FIG. 2. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment a packet may be received that comprises a data portion and a header portion, as described above. In various embodiments, the header portion may comprise at least one header, as described above. In various embodiments, one or more of the action(s) illustrated by this Block may be performed by the apparatus 100 or the ingress port 102 of FIG. 1, as described above.

Block 504 illustrates that, in one embodiment, the header portion may be recursively processed, from outer-most header to inner-most header, until an adjacency value for the packet may be determined, as described above. In one embodiment, processing may include storing the header portion within a cache, as described above. In such an embodiment, processing may also include assigning the header portion to one of a plurality of processing engines, as described above. In various embodiments, processing may include processing one header of the header portion by the processing engine or ingress recursion engine, as described above. In some embodiments, processing may include removing the processed header from the header portion, as described above. In one embodiment, processing may include returning the header portion to the cache, as described above.

In another embodiment, processing may include receiving, by a processing engine or ingress recursion engine, a header to be processed, as described above. In various embodiments, processing may include receiving, by the processing engine, a header type denoting the type of header to be processed, as described above. In such an embodiment, processing may include receiving, by the processing engine, an interface identifier denoting the type of interface used by the header, as described above. In various embodiments, processing may also include obtaining a set of processing results using the header, as described above. In various embodiments, processing may include determining whether or not the header comprises a destination for the packet, as described above. In various embodiments, if so, processing may include generating an adjacency value that comprises the destination of the packet and how the packet is to be transmitted, as described above. In another embodiment, if not, processing may include generating an interface identifier denoting the type of interface used by the next header to be processed within the header portion of the packet, as described above. In some embodiments, processing may include if further headers may be processed, generating a next header type denoting the type of the next header to be processed, as described above.

In yet another embodiment, processing may include serially processing one header of the header portion at a time, as described above. In some embodiments, processing may include storing the process results obtained by processing the header, as described above. In a number of embodiments, processing may include presenting the process results from the header portion to a classification engine that is capable of classifying the packet based upon a set of rules and the process results, as described above. In one embodiment, presenting the process results may include accumulating the process results from each header, until the processing of the header portion is complete; arranging the serially obtained process results into a parallel format; and presenting the parallel formatted process results of the header portion to the classification engine. In yet one more embodiment, processing may include using a lookup table to process the header portion, wherein the lookup table is shared by a plurality of processing engines, as described above.

In another embodiment, processing may include partially examining an outer header to determine if an inner header should be processed first, as described above. If so, in one embodiment, processing may include processing the inner header, and returning to the outer header, as described above. In such an embodiment, processing may include processing the outer header; and skipping over the previously processed inner header to process another header, as described above.

In various embodiments, one or more of the action(s) illustrated by this Block may be performed by the apparatus 100, the ingress header cache 104, the ingress recursion engine 106, or the lookup tables 108 of FIG. 1, or the ingress recursion engine 300 of FIG. 3, as described above.

Block 506 illustrates that, in one embodiment, the header portion may be further processed to determine additional header data, as described above. Block 508 illustrates that, in one embodiment, the additional header data may be provided to a rule set, as described above. Block 510 illustrates that, in one embodiment, the transmission of the data or packet may be controlled based at least in part upon the rule set, as described above. In various embodiments, one or more of the action(s) illustrated by these Blocks may be performed by the apparatus 100, the ingress recursion engine 106, the classification engine 118, the rule set 120, or the lookup tables 108 of FIG. 1, or the ingress recursion engine 300 of FIG. 3, as described above.

Block 512 illustrates that, in one embodiment, the packet may be transmitted based upon the adjacency value, as described above. In one embodiment, transmitting may include recursively building a new header portion, from the inner-most header to the outer-most header, until a header is associated with an interface identifier, as described above. In various embodiments, transmitting may also include replacing the original header portion of the packet with the new header portion, as described above. In some embodiments, transmitting may include transmitting the packet based upon the interface identifier, as described above.

In various embodiments, building a new header portion may include adding at least one header to any headers, if any, not processed during the recursive processing of the original header portion, as described above. In some embodiments, adding a header may include receiving, by a processing engine, an adjacency value associated with the header portion, as described above. In various embodiments, adding a header may include determining the proper header to add based upon the adjacency value, as described above. In one embodiment, adding a header may include adding the determined header to the header portion, as described above. In some embodiments, adding a header may include determining if the determined header is associated with a new adjacency value. In some embodiments, if so, adding a header may include adding a new header to the header portion using the new adjacency value, as described above. In another embodiment, if not, adding a header may include retrieving an interface identifier, as described above.

In various embodiments, one or more of the action(s) illustrated by this Block may be performed by the apparatus 100, the egress header cache 112, the egress recursion engine 110, or the lookup tables 108 of FIG. 1, or the egress recursion engine 400 of FIG. 4, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
an ingress port configured to receive a packet that comprises a data portion and a header portion, wherein the header portion comprises at least one header;
a header cache configured to store at least a part of the header portion of the packet, but not the data portion of the packet; and
a plurality of ingress recursion engines,
wherein each ingress recursion engine is configured to process a header from the header portion, and
wherein the plurality of ingress recursion engines, collectively, are configured to recursively process the header portion, at least partially, from outer-most header to inner-most header, until an adjacency value for the packet is determined; and
wherein the recursively processing by the plurality of ingress recursion engines, collectively, comprises:
partially examining an outer header to determine if an inner header should be processed first;
if so, processing the inner header, returning to the outer header, processing the outer header, and skipping over the previously processed inner header to process another header.

2. The apparatus of claim 1 wherein each ingress recursion engine comprises a parser configured to:
receive the header and a header type value, and to extract header fields from the header;
a lookup engine configured to retrieve values from a lookup table using the extracted header fields;
a header validation engine configured to determine whether or not the header is valid; and
a next state calculator configured to, based at least in part upon outputs of the parser, lookup engine, header validation engine, and an interface identifier:
generate either a new interface identifier or the adjacency value,
generate a next header type value, and
generate a next header location value.

3. The apparatus of claim 1 further comprising:
a plurality of lookup tables configured to return stored values in response to receiving a combination of two or more of the following: header fields, interface identifiers, and adjacency values; and
wherein the number of lookup tables is less than the number of ingress recursion engines.

4. The apparatus of claim 1 wherein the plurality of ingress recursion engines is, collectively, configured to: simultaneously process a plurality of received packets.

5. The apparatus of claim 1 further comprising:
at least one egress port configured to transmit the packet to another device;
a plurality of egress recursion engines configured to:
recursively build a new header portion, from the inner-most header to the outer-most header, until a newly built header is associated with an interface identifier; and wherein each egress recursion engine is configured to add a header to the new header portion.

6. The apparatus of claim 5 each egress recursion engine comprises:
a header creator configured to:
accept the adjacency value,
determine which new header to add, based at least in part upon the adjacency value,
complete the field values of the new header, and
assemble the field values into the new header format;
a lookup engine configured to:
provide, based upon the new header, either a new adjacency value or a new interface identifier; and
a next state calculator configured to determine if the new header portion is complete.

7. The apparatus of claim 6 wherein the next state calculator is configured to: if the lookup engine provided the new adjacency value, consider the new header portion to be incomplete; and if the lookup engine provided the new interface identifier, consider the new header portion to be complete.

8. The apparatus of claim 1, wherein at least one ingress recursion engine is configured to process a meta-header from the header portion, wherein the meta-header includes a plurality of headers combined into a single header that may be processed together.

9. A method comprising:
receiving a packet that comprises a data portion and a header portion, wherein the header portion comprises at least one header;
storing at least part of the header portion of the packet in a header cache separately from the data portion of the packet;
recursively processing the header portion, at least partially from outer-most header to inner-most header, until an adjacency value for the packet is determined, and
wherein recursively processing comprises:
partially examining an outer header to determine if an inner header should be processed first,
if so, processing the inner header, returning to the outer header, processing the outer header, and skipping over the previously processed inner header to process another header; and
transmitting the packet based at least in part upon the adjacency value.

10. The method of claim 9 wherein recursively processing further comprises:
storing the header portion within a cache;
assigning the header portion to one of a plurality of processing engines; processing one header of the header portion by the one processing engine;
removing the processed header from the header portion; and returning the header portion to the cache.

11. The method of claim 9 wherein recursively processing further comprises:
receiving, by a processing engine, a header to be processed;
receiving, by the processing engine, a header type denoting the type of header to be processed;
receiving, by the processing engine, an interface identifier denoting the type of interface used by the header;
obtaining a set of processing results using the header;
determining whether or not the header comprises information denoting a destination for the packet;
if so, generating the adjacency value that comprises information denoting the destination of the packet and how the packet is to be transmitted;
if not, generating a new interface identifier denoting the type of interface used by the next header to be processed within the header portion of the packet; and
if further headers may be processed, generating a next header type denoting the type of the next header to be processed.

12. The method of claim 9 wherein recursively processing further comprises: using a lookup table to process the header portion, wherein the lookup table is shared by a plurality of processing engines.

13. The method of claim 9 wherein recursively processing further comprises:
serially processing one header of the header portion at a time;
storing the process results obtained by processing the one header; and
presenting the process results from the header portion to a classification engine that is capable of classifying the packet based upon a set of rules and the process results.

14. The method of claim 13 wherein presenting the process results comprises:
accumulating the process results from each header, until the processing of the header portion is complete;
arranging the serially obtained process results into a parallel format; and
presenting the parallel formatted process results of the header portion to the classification engine.

15. The method of claim 9 further comprising:
further processing the header portion to determine additional header data;
providing the additional header data to a rule set; and
controlling the transmission of the packet based at least in part upon the rule set.

16. The method of claim 9 wherein transmitting comprises: recursively building a new header portion, from the inner-most header to the outer-most header of the new header portion, until a header of the new header portion is associated with an interface identifier; replacing the original header portion of the packet with the new header portion; transmitting the packet based upon the interface identifier.

17. The method of claim 16 wherein building a new header portion comprises:
adding at least one header to any headers not deleted during the recursive processing of the original header portion;
wherein adding a header comprises:
receiving, by a processing engine, the adjacency value associated with the header portion;
determining the proper header to add based upon the adjacency value;

adding the determined header to the new header portion;
determining if the determined header is associated with a new adjacency value;
if so, adding a new header to the new header portion using the new adjacency value; and
if not, retrieving an interface identifier.

18. A microchip device comprising:
at least one ingress port configured to receive a packet that comprises a data portion and a header portion, wherein the header portion comprises at least one header;
a plurality of ingress recursion engines configured to:
recursively process the header portion, at least partially, from outer-most header to inner-most header, until an adjacency value for the packet may be determined, wherein recursively processing comprises partially examining an outer header to determine if an inner header should be processed first, if so, processing the inner header, returning to the outer header, processing the outer header, and skipping over the previously processed inner header to process another header;
a header cache configured to store at least a part of the header portion of the packet separately from the data portion of the packet;
a classification engine configured to apply a set of rules to the packet based upon the results of the recursive processing by the plurality of ingress recursion engines;
a plurality of egress recursion engines configured to:
recursively build a new header portion, from the inner-most header to the outer-most header of the new header portion, until a header is associated with an interface identifier; and
at least one egress port configured to transmit the packet to another device.

19. The microchip device of claim 18 wherein each ingress recursion engine comprises:
a parser configured to:
receive a current header and a header type value, and
to extract header fields from the current header;
a lookup engine configured to retrieve values from a lookup table using the extracted header fields and an interface identifier received by the ingress recursion engine;
a header validation engine configured to determine whether or not the header is valid; and
a next state calculator configured to, using the outputs of the parser, lookup engine, header validation engine, and the interface identifier:
generate either a new interface identifier or the adjacency value,
generate a next header type value, and
generate a next header location value.

20. The microchip device of claim 18 wherein each egress recursion engine comprises:
a header creator configured to:
accept the adjacency value,
determine which new header to add, based at least in part upon the adjacency value,
complete the field values of the new header, and
assemble the field values into the new header format;
a lookup engine configured to provide, based upon the new header, either a new adjacency value or a new interface identifier; and
a next state calculator configured to determine if the new header portion is complete.

* * * * *